United States Patent
Yoon et al.

(10) Patent No.: US 11,592,934 B2
(45) Date of Patent: Feb. 28, 2023

(54) TOUCH POWER MANAGEMENT CIRCUIT AND TOUCH DRIVING SYSTEM INCLUDING THE SAME

(71) Applicant: LX Semicon Co., Ltd., Daejeon (KR)

(72) Inventors: Seong Sik Yoon, Daejeon (KR); Seong Wha Hong, Daejeon (KR); Ju Hyoung Lee, Daejeon (KR)

(73) Assignee: LX SEMICON CO., LTD, Daejeon (KR)

( * ) Notice: Subject to any disclaimer, the term of this patent is extended or adjusted under 35 U.S.C. 154(b) by 0 days.

(21) Appl. No.: 17/858,930

(22) Filed: Jul. 6, 2022

(65) Prior Publication Data

US 2023/0008655 A1 Jan. 12, 2023

(30) Foreign Application Priority Data

Jul. 8, 2021 (KR) .................. KR10-2021-0089701

(51) Int. Cl.
*G06F 3/041* (2006.01)
*G06F 3/0354* (2013.01)
*G06F 1/3231* (2019.01)

(52) U.S. Cl.
CPC ........ *G06F 3/04166* (2019.05); *G06F 1/3231* (2013.01); *G06F 3/03545* (2013.01); *G06F 3/04162* (2019.05); *G06F 3/0412* (2013.01)

(58) Field of Classification Search
CPC .. G06F 1/3231; G06F 3/03545; G06F 3/0412; G06F 3/04162; G06F 3/04166
See application file for complete search history.

(56) References Cited

U.S. PATENT DOCUMENTS 11,243,644 B2 * 2/2022 Ju ........................ G06F 3/04166
2020/0210021 A1 * 7/2020 Ju ........................ G06F 3/0442

FOREIGN PATENT DOCUMENTS

KR 2021-0059961 A 5/2021
KR 2021-0080981 A 7/2021

* cited by examiner

*Primary Examiner* — Michael Pervan
(74) *Attorney, Agent, or Firm* — Polsinelli PC

(57) ABSTRACT

The present embodiment relates to a touch power management circuit and a touch driving system including the same, and more particularly, to a touch power management circuit that prevents unnecessary power consumption during a pen touch driving period in order to reduce power consumption of a display device, and a touch driving system including the same.

18 Claims, 10 Drawing Sheets

|  | Input Signal | | Control | | | | |
|---|---|---|---|---|---|---|---|
|  | Tsync | PWM | First amplifier | Second amplifier | M_VCOM | Third amplifier | M_VGL |
| DP | H |  | off | off | off | Off | off |
| TP_Finger | L | H/L | on | on | on | on | on |
| TP_U-LINK | L | H/L | on | on | on | on | on |
| TP_D-LINK | L | L | on | on | on | on | on |
| S_TP | L | H/L | on | on | on | on | on |
| S_BP | H |  | off | off | off | off | off |

*FIG. 5*

|  | Input Signal | | Control | | | | |
|---|---|---|---|---|---|---|---|
|  | Tsync | PWM | First amplifier | Second amplifier | M_VCOM | Third amplifier | M_VGL |
| DP | H |  | off | off | off | Off | off |
| TP_Finger | L | H/L | on | on | on | on | on |
| TP_U-LINK | L | H/L | on | on | on | on | on |
| TP_D-LINK | L | L | on | on | on | on | on |
| S_TP | L | H/L | on | on | on | on | on |
| S_BP | H |  | off | off | off | off | off |

FIG. 7

|  | Input Signal | | | | Control | | | | |
| --- | --- | --- | --- | --- | --- | --- | --- | --- | --- |
|  | Tsync | PWM | TPEN | S3 | First amplifier | Second amplifier | M_VCOM | Third amplifier | M_VGL |
| DP | H |  | L | L | off | off | off | off | off |
| TP_Finger | L | H/L | L | L | on | on | on | on | on |
| TP_U-LINK | L | H/L | H | L | on | on | on | on | on |
| TP_D-LINK | H |  | H | L | on | on | off | off | off |
| S_TP | L | H/L | L | H | on | on | on | off | off |
| S_BP | H |  | L | L | off | off | off | off | off |

TOUCH POWER MANAGEMENT CIRCUIT AND TOUCH DRIVING SYSTEM INCLUDING THE SAME

CROSS REFERENCE TO RELATED APPLICATION

This application claims priority from Republic of Korea Patent Application No. 10-2021-0089701 filed on Jul. 8, 2021, which is hereby incorporated by reference in its entirety.

BACKGROUND

1. Field of Technology

The present disclosure relates to a touch power management circuit and a touch driving system including the same.

2. Description of the Prior Art

One of the most important issues in electronic devices including mobile devices is to minimize power consumption. In other words, as the capacity of a battery is limited and electronic devices are miniaturized, power consumption needs to be continuously lowered, so research into the reduction of power consumption of the electronic devices is being conducted more actively.

Recently, since a touch display mounted on most electronic devices includes a touch sensing circuit, which recognizes the touch of a touch pen or a finger and is to a general display, it consumes more power than a general display device.

A touch power management circuit known as a touch management integrated circuit (TMIC) generates a voltage signal required for touch driving inside the touch display and supplies the generated voltage signal to a touch sensing circuit. Accordingly, the touch power management circuit may consume more power than the other components of the touch display.

Recently, since the number of electronic devices (for example, smart phones, laptops, tablet PCs, and the like) using a battery as a power source tends to increase, research is being conducted to reduce battery consumption of the electronic devices by minimizing the power consumption of the touch power management circuit.

In this regard, the present embodiment provides a technology of improving the power consumption of the touch power management circuit.

SUMMARY OF THE INVENTION

Under such a background, in an aspect, various embodiments are directed to providing a technology of preventing unnecessary power consumption during a pen touch driving period in order to reduce the power consumption of a display device.

In an aspect, various embodiments are directed to providing a touch power management circuit including: a driving signal generation circuit configured to output a pen touch driving signal to a touch electrode during an uplink period for pen touch driving and to output a direct current (DC) voltage to the touch electrode during a downlink period for pen touch driving; and a load free driving (LFD) signal generation circuit including one amplifier for generating a first load free driving signal corresponding to the pen touch driving signal, and configured to turn on the one amplifier to generate the first load free driving signal during the uplink period and to turn off the one amplifier during the downlink period.

In another aspect, various embodiments are directed to providing a touch driving system including: a touch driving device configured to drive a plurality of touch electrodes disposed in a panel of a display device; and a touch power management circuit configured to receive a common electrode voltage VCOM and a gate low voltage VGL from a power management circuit, to generate a pen touch driving signal and a load free driving (LFD) signal corresponding to the pen touch driving signal and output the generated pen touch driving signal and load free driving signal to the touch driving device during an uplink period for pen touch driving, and to turn off an amplifier for generating the load free driving signal while outputting the common electrode voltage and the gate low voltage to the touch driving device during a downlink period for pen touch driving.

As is apparent from the above, according to the present embodiment, power consumption of a display device can be reduced because a touch power management circuit prevents unnecessary power consumption during a downlink period for pen touch driving.

BRIEF DESCRIPTION OF THE DRAWINGS

FIG. 5 and FIG. 6 are diagrams for explaining a method for driving a general touch power management circuit.

FIG. 7 to FIG. 9 are diagrams for explaining a method for driving the touch power management circuit in accordance with an embodiment.

DETAILED DESCRIPTION OF THE EXEMPLARY EMBODIMENTS

Figure 1:
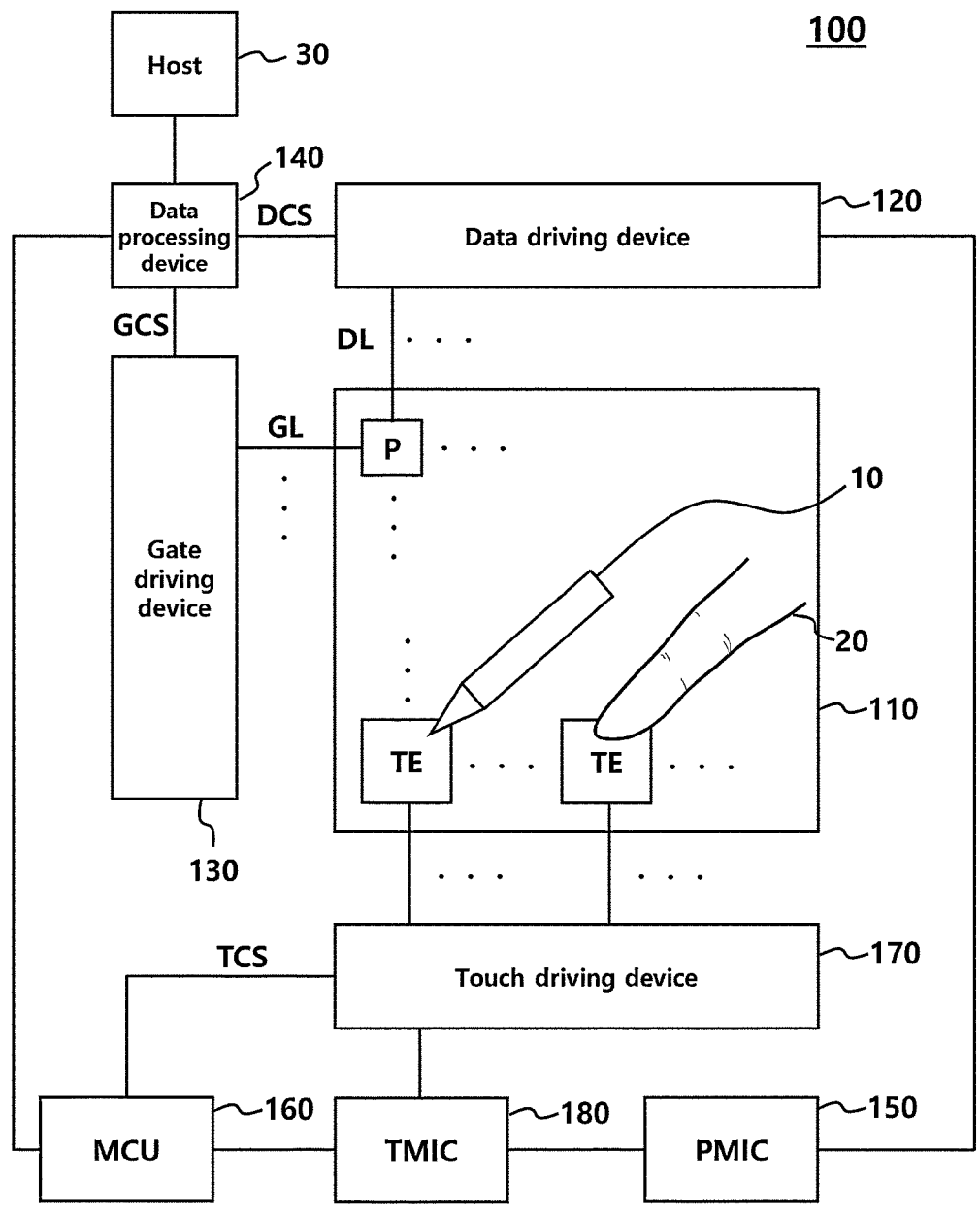
FIG. 1 is a configuration diagram of a display device in accordance with an embodiment.

FIG. 1 is a configuration diagram of a display device in accordance with an embodiment.

Referring to FIG. 1, a display device 100 may include a panel 110, a data driving device 120, a gate driving device 130, a data processing device 140, a power management circuit (power management integrated circuit (PMIC)) 150, a touch controller (micro controller unit (MCU)) 160, a touch driving device 170, and a touch power management circuit (touch management integrated circuit (TMIC)) 180.

One or more of the data driving device 120, the gate driving device 130, the touch driving device 170, the PMIC 150, and the TMIC 180 may be included in one integrated circuit (IC).

For example, the data driving device 120 and the touch driving device 170 may be included in one integrated circuit, and the integrated circuit including the data driving device 120 and the touch driving device 170 may be referred to as a source readout circuit (source readout integrated circuit (SRIC)).

In an embodiment, the panel 110, the MCU 160, the touch driving device 170, and the TMIC 180 may be classified into a touch driving system.

The data driving device 120 may drive a data line DL connected to a pixel P and the gate driving device 130 may drive a gate line GL connected to the pixel P. Furthermore, the touch driving device 170 may drive a touch electrode TE disposed in the panel 110.

On the panel 110, a plurality of data lines DL and a plurality of gate lines GL may be disposed and a plurality of pixels P may be disposed.

Furthermore, on the panel 110, a plurality of touch electrodes TE may be disposed.

In other words, the panel 110 may include a display panel, and may further include a touch panel (touch screen panel (TSP)). The display panel and the touch panel may share some components. For example, a touch electrode TE of the touch panel may be used as a common electrode of the display panel, to which a common electrode voltage is supplied.

The data driving device 120 may supply a data voltage to the data lines DL in order to display an image in each pixel P of the panel 110. The data driving device 120 may include one or more data driver integrated circuits, and such one or more data driver integrated circuits may be connected to a bonding pad of the panel 110 by a tape automated bonding (TAB) method or a chip on glass (COG) method, or may be directly formed on the panel 110. Furthermore, the data driving device 120 may also be implemented by a chip on film (COF) method.

The data driving device 120 may receive image data and a data control signal DCS from the data processing device 140. The data driving device 120 may generate a data voltage according to a grayscale value of each pixel indicated by the image data, and drive each pixel.

The data control signal DCS may include one or more synchronization signals. For example, the data control signal DCS may include a vertical synchronization signal VSYNC, a horizontal synchronization signal HSYNC, and the like.

The data driving device 120 may divide a frame according to the vertical synchronization signal VSYNC, and drive each pixel in periods other than a vertical blank period indicated by the vertical synchronization signal VSYNC. The data driving device 120 may check image data for each horizontal line according to the horizontal synchronization signal HSYNC, and supply a data voltage for each horizontal line.

The gate driving device 130 may supply a scan signal to the gate lines GL in order to turn on/off a transistor located in each pixel P. Although FIG. 1 illustrates that the gate driving device 130 is located on only one side of the panel 110, the gate driving device 130 may be located on either side of the panel 110 according to a method for driving the display device 100.

Such a gate driving device 130 may include one or more gate driver integrated circuits, and may be connected to the bonding pad of the panel 110 by the tape automated bonding (TAB) method or the chip on glass (COG) method, or may be implemented in a gate in panel (GIP) type and directly formed on the panel 110. Furthermore, the gate driving device 130 may also be implemented by the chip on film (COF) method.

The gate driving device 130 may receive a gate control signal GCS from the data processing device 140. The gate control signal GCS may include a plurality of clock signals. Furthermore, the gate driving device 130 may generate the scan signal by using the clock signal, and supply the generated scan signal to the gate lines GL.

The data processing device 140 may receive image data from a host 30.

The data processing device 140 may process the image data. For example, the data processing device 140 may adjust a grayscale value included in the image data or correct the image data by reflecting the characteristics of the pixels P.

The data processing device 140 may transmit the processed image data to the data driving device 120.

The data processing device 140 may generate the data control signal DCS, the gate control signal GCS, a touch synchronization signal Tsync, and the like.

The data processing device 140 may transmit the data control signal DCS to the data driving device 120, and transmit the gate control signal GCS to the gate driving device 130.

Furthermore, the data processing device 140 may transmit the touch synchronization signal Tsync to the MCU 160. The touch synchronization signal Tsync may be a signal obtained by time-dividing a frame time corresponding to one frame into a display driving period DP and a touch driving period TP as illustrated in FIG. 2.

Figure 2:
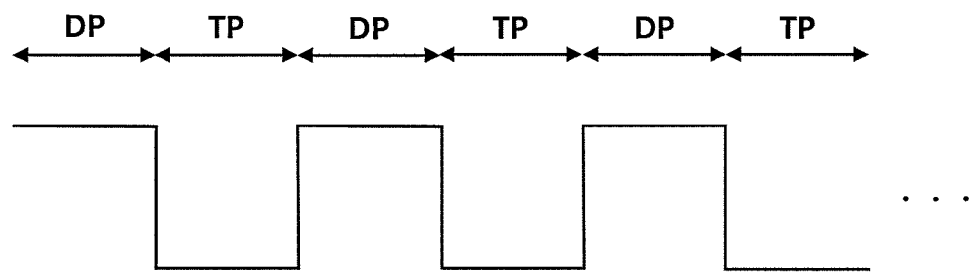
FIG. 2 is a diagram for explaining a general touch synchronization signal.

Although FIG. 2 illustrates that the frame time is time-divided into a plurality of display driving periods DP and touch driving periods TP, the frame time may be time-divided into one display driving period DP and one touch driving period TP.

In other words, one frame may be time-divided into a plurality of display driving periods DP and touch driving periods TP or may be time-divided into one display driving period DP and one touch driving period TP.

The PMIC 150 may generate voltages (power) to be supplied to each component in the display device 100 and output the generated voltages (power) to respective components in the display device 100. For example, the PMIC 150 may generate a common electrode voltage VCOM and output the generated common electrode voltage VCOM to the panel 110. Furthermore, the PMIC 150 may generate a gate low voltage VGL and a gate high voltage VGH to output the generated gate low voltage VGL and gate high voltage VGH to the gate driving device 130, and generate a power supply voltage to output the generated power supply voltage to the data driving device 120. The power supply voltage may include one or more of AVDD, AVSS, PVDD, NVDD, VDD, and VSS.

The PMIC 150 may output the common electrode voltage VCOM and the gate low voltage VGL to the TMIC 180.

The MCU 160 may receive the touch synchronization signal Tsync from the data processing device 140, and identify the display driving period DP and the touch driving period TP according to the touch synchronization signal Tsync.

The MCU 160 may divide the touch driving period TP into a finger touch driving period and a pen touch driving period according to preset setting information.

Furthermore, the MCU 160 may divide the pen touch driving period into an uplink period and a downlink period according to the preset setting information. The uplink period may indicate a period in which the touch driving device 170 supplies a pen touch driving signal to the touch electrode TE, and the downlink period may indicate a period in which the touch driving device 170 receives a downlink signal of an active pen 10 through the touch electrode TE.

Figure 9:
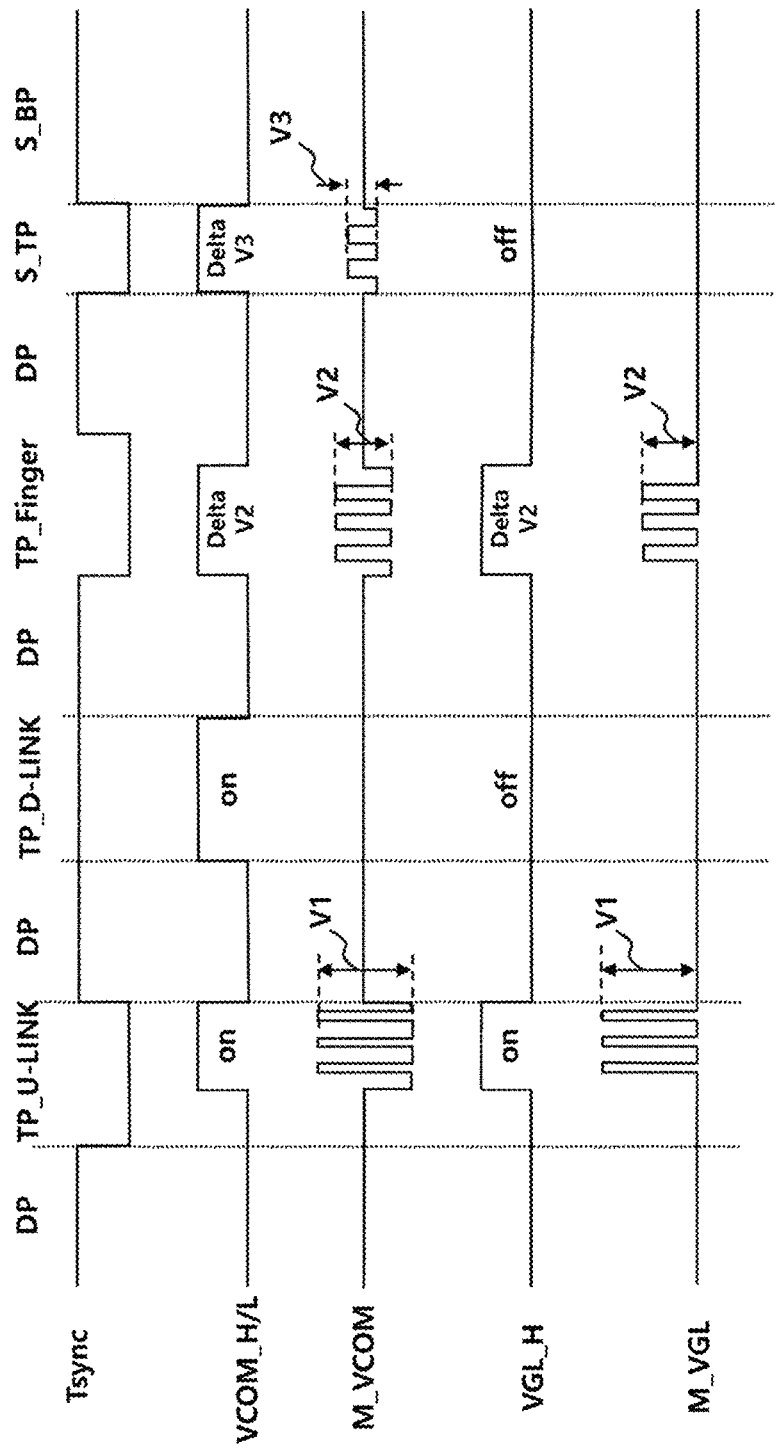
Figure 10:
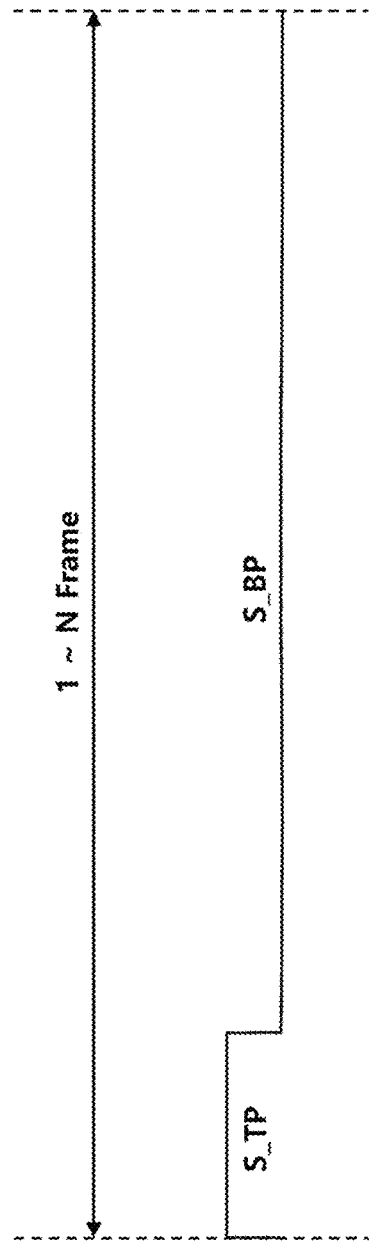
FIG. 10 is a diagram for explaining a second identification signal in accordance with an embodiment.

Meanwhile, when the display device 100 is switched to a sleep mode for reducing power consumption, the MCU 160 may also identify a touch check period (see S_TP in FIG. 6, FIG. 8, or FIG. 9) and a blank period (see S_BP in FIG. 6, FIG. 8, or FIG. 9) in the sleep mode according to the touch synchronization signal Tsync. The touch check period S_TP may indicate a period in which the touch driving device 170 is driven to check whether touch is input in the sleep mode, and the blank period S_BP may indicate a period in which the touch driving device 170 is not driven in the sleep mode. In the sleep mode, the blank period S_BP may be continued during one or more frames (1 to N frames) as illustrated in FIG. 10. In other words, a cycle in which the touch check period S_TP is reached may be the sum of one or more frame times.

As described above, the MCU 160 may internally use the touch synchronization signal Tsync. Then, the MCU 160 may transmit the touch synchronization signal Tsync to the TMIC 180 and the touch driving device 170.

During the touch driving period TP, the MCU 160 may generate a pulse width modulation signal (PWM) and transmit the generated PWM to the TMIC 180.

Specifically, the MCU 160 may generate the PWM in a finger touch driving period (see TP_Finger in FIG. 7) and an uplink period (see TP_U-LINK in FIG. 7), and transmit the generated PWM to the TMIC 180. Furthermore, the MCU 160 may generate the PWM even during the touch check period (see S_TP in FIG. 7) in the sleep mode, and transmit the generated PWM to the TMIC 180.

The MCU 160 may not generate the PWM during the display driving period DP and the blank period S_BP in the sleep mode. Furthermore, the MCU 160 may not also generate the PWM even during the downlink period (see TP_D-LINK in FIG. 7) within the touch driving period TP.

Meanwhile, in an embodiment, the MCU 160 may additionally generate a first identification signal (see TPEN in FIG. 7) for identifying the uplink period TP_U-LINK and the downlink period TP_D-LINK, and transmit the first identification signal to the TMIC 180.

Furthermore, the MCU 160 may additionally generate a second identification signal (see S3 in FIG. 7) for identifying the touch check period S_TP, and transmit the second identification signal to the TMIC 180.

In the related art, since the MCU 160 transmits only the touch synchronization signal Tsync and the PWM to the TMIC 180, the MCU 160 and the TMIC 180 may be connected through two signal lines and may individually transmit/receive the touch synchronization signal Tsync and the PWM through the two signal lines.

However, in an embodiment, since the MCU 160 additionally transmits one or more of the first identification signal TPEN and the second identification signal S3 to the TMIC 180, one or more signal lines may be added between the MCU 160 and the TMIC 180.

For example, the MCU 160 and the TMIC 180 may be connected through a first signal line to a third signal line, and the touch synchronization signal Tsync may be transmitted/received through the first signal line. Furthermore, the PWM may be transmitted/received through the second signal line, and the first identification signal TPEN may be transmitted/received through the third signal line.

When the MCU 160 additionally generates the second identification signal S3, a fourth signal line may be further connected between the MCU 160 and the TMIC 180, and the second identification signal S3 may be transmitted/received through the fourth signal line.

The touch driving device 170 may drive the touch electrode TE by using a touch driving signal during the touch driving period TP.

In such a case, the touch driving device 170 may sense a pen touch using the active pen 10 and a finger touch using a finger 20.

To this end, the touch driving device 170 may supply a pen touch driving signal to the touch electrode TE during the uplink period TP_U-LINK for pen touch driving, and supply a finger touch driving signal to the touch electrode TE during the finger touch driving period TP_Finger. The pen touch driving signal may be a beacon signal including various operation control information of the active pen 10 or a ping signal for synchronization of a downlink signal.

Meanwhile, the touch driving device 170 may receive a downlink signal transmitted from the active pen 10 to the touch electrode TE during the downlink period TP_D-LINK for pen touch driving.

The touch driving device 170 may transmit a sensing signal, which is obtained by sensing a pen touch or a finger touch to the MCU 160. Furthermore, the touch driving device 170 may transmit a downlink signal to the MCU 160.

The MCU 160 may determine the presence or absence of a touch through the sensing signal received from the touch driving device 170. Furthermore, the MCU 160 may also calculate touch coordinates through the sensing signal.

The touch driving device 170 may receive a touch control signal TCS from the MCU 160.

The touch control signal TCS may include the touch synchronization signal Tsync. The touch driving device 170 may identify the display driving period DP and the touch driving period TP according to the touch synchronization signal Tsync.

The TMIC 180 may receive the touch synchronization signal Tsync and the PWM from the MCU 160, and output a touch driving signal required for driving the touch electrode TE to the touch driving device 170 by using the touch synchronization signal Tsync and the PWM. The touch driving signal outputted to the touch driving device 170 may be supplied to the touch electrodes TE.

The touch driving signal may include a pen touch driving signal for pen touch driving and a finger touch driving signal for finger touch driving.

The TMIC 180 may output a load free driving (LFD) signal while outputting the touch driving signal to the touch driving device 170. The LFD signal may be supplied to other electrodes around the touch electrodes TE to which the touch driving signal is supplied.

For example, when the touch driving signal is supplied to the touch electrodes TE, the LFD signal may be supplied to the data line DL or the gate line GL located around the touch electrodes TE. Furthermore, the LFD signal may also be supplied to touch electrodes TE to which the touch driving signal is not supplied. The phase and amplitude of the LFD signal may be the same as those of the touch driving signal. In other words, the LFD signal may correspond to the touch driving signal.

When the LFD signal is supplied to the data line DL, the LFD signal may pass through the data driving device 120. When the LFD signal is supplied to the gate line GL, the LFD signal may pass through the gate driving device 130.

Such an LFD signal may include a first LFD signal corresponding to the pen touch driving signal and a second LFD signal corresponding to the finger touch driving signal.

In an embodiment, the TMIC 180 may further receive the first identification signal TPEN from the MCU 160.

The TMIC 180 may identify the uplink period TP_U-LINK and the downlink period TP_D-LINK by checking the signal levels of the touch synchronization signal Tsync and the first identification signal TPEN. The TMIC 180 may identify, as an uplink period, a case where the signal levels of the touch synchronization signal Tsync and the first identification signal TPEN are different from each other, and identify, as a downlink period a case where the signal levels of the touch synchronization signal Tsync and the first identification signal TPEN are the same as each other, as illustrated in FIG. 7.

In an embodiment, the TMIC 180 may prevent unnecessary power consumption during the downlink period TP_D-LINK.

Specifically, the TMIC 180 may generate the pen touch driving signal and the first LFD signal corresponding to the pen touch driving signal during the uplink period for pen touch driving, and output the generated signals to the touch driving device 170.

During the downlink period for pen touch driving, the TMIC 180 may turn off an amplifier for generating the first LFD signal while outputting the common electrode voltage VCOM and the gate low voltage VGL to the touch driving device 170. In other words, the TMIC 180 may block one or more of a power supply voltage and a bias voltage, which are supplied to the amplifier, during the downlink period.

In such a case, the TMIC 180 may receive the common electrode voltage VCOM and the gate low voltage VGL from the PMIC 150.

In an embodiment, the TMIC 180 may further receive the second identification signal S3 from the MCU 160.

The TMIC 180 may check the signal level of the second identification signal S3, and identify whether the touch check period S_TP has reached in the sleep mode. In such a case, when the signal level of the second identification signal S3 is a first level (for example, a high (H) level in FIG. 7), the TMIC 180 may identify that the touch check period has reached in the sleep mode of the display device 100. At this time, the signal levels of the touch synchronization signal Tsync and the first identification signal TPEN may both be second levels (for example, a low (L) level) as illustrated in FIG. 7.

In an embodiment, the TMIC 180 may prevent unnecessary power consumption during the touch check period S_TP.

Specifically, the TMIC 180 may generate a touch driving signal for a sleep mode, whose signal intensity is lower than that of the finger touch driving signal, during the touch check period S_TP, and output the generated touch driving signal to the touch driving device 170.

In addition, the TMIC 180 may output a gate low voltage to the touch driving device 170.

Hereinafter, components of the TMIC 180 for preventing unnecessary power consumption during the downlink period TP_D-LINK and preventing unnecessary power consumption even during the touch check period S_TP in the sleep mode will be described.

Figure 3:
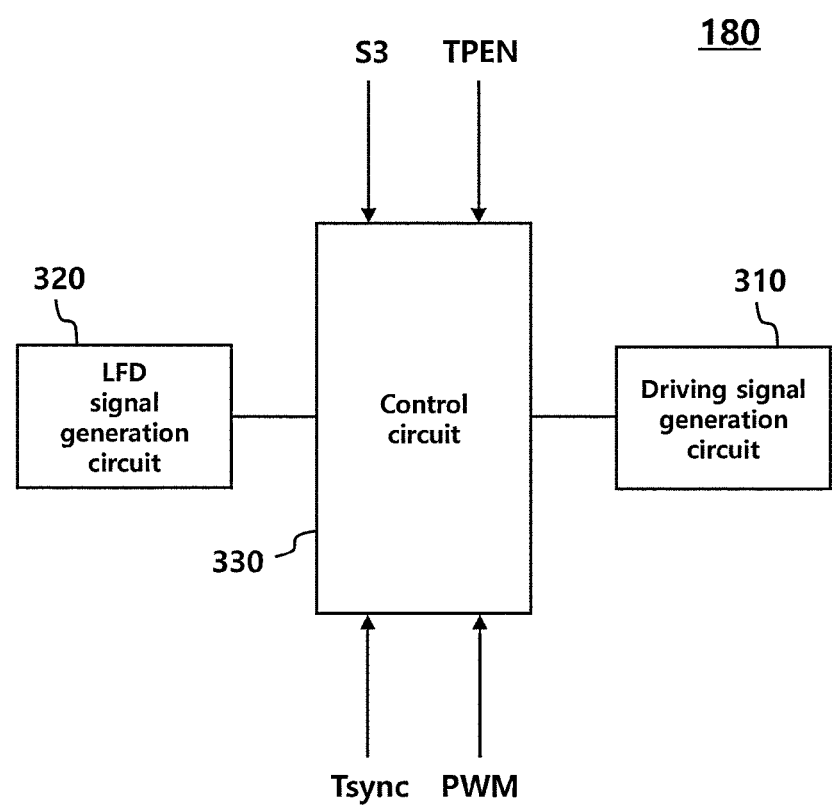
FIG. 3 is a block configuration diagram schematically illustrating a touch power management circuit in accordance with an embodiment.
Figure 4:
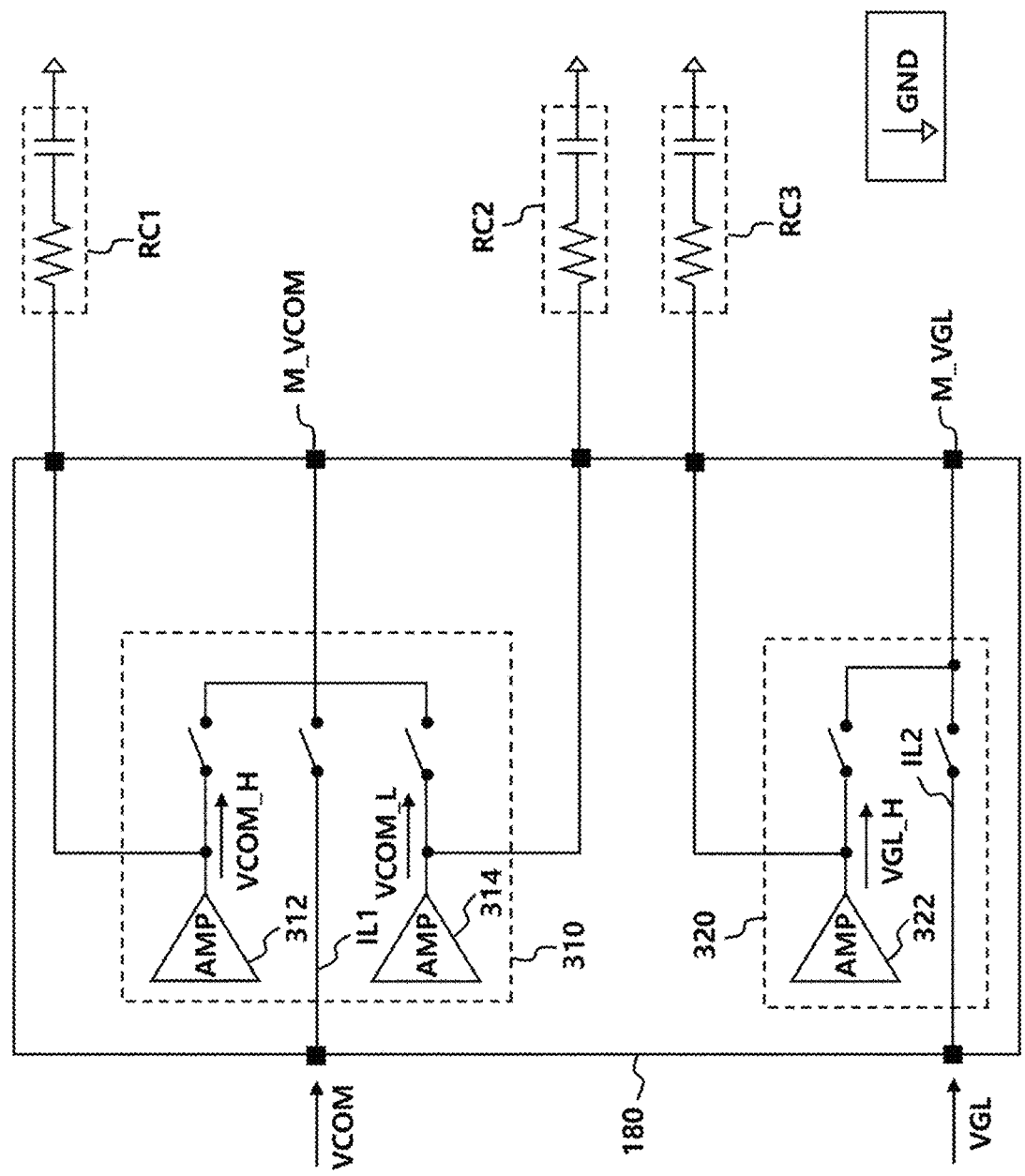
FIG. 4 is a configuration diagram of the touch power management circuit in accordance with an embodiment.

FIG. 3 is a block configuration diagram schematically illustrating the TMIC in accordance with an embodiment, and FIG. 4 is a configuration diagram of the TMIC in accordance with an embodiment.

As illustrated in FIG. 3, the TMIC 180 in accordance with an embodiment may include a driving signal generation circuit 310, an LFD signal generation circuit 320, and a control circuit 330.

As illustrated in FIG. 4, the driving signal generation circuit 310 may include a first amplifier (AMP) 312 and a second amplifier (AMP) 314 for generating a pen touch driving signal or a finger touch driving signal having a lower signal intensity than the pen touch driving signal. Furthermore, the driving signal generation circuit 310 may further include switch circuits connected to the first AMP 312, the second AMP 314, and a VCOM input line IL1, respectively. External compensation circuits RC1 and RC2 may be connected in parallel to an output side of the first AMP 312 and an output side of the second AMP 314.

The driving signal generation circuit 310 may turn on the first AMP 312 and the second AMP 314 during the uplink period TP_U-LINK for pen touch driving, generate the pen touch driving signal, and output the generated pen touch driving signal to a first output terminal M_VCOM. The switch circuit connected to the first AMP 312 and the switch circuit connected to the second AMP 314 may alternately repeat turn-on or turn-off. The switch circuit connected to the VCOM input line IL1 may maintain a turn-off state.

During the downlink period TP_D-LINK for pen touch driving, the driving signal generation circuit 310 may output a common electrode voltage VCOM externally inputted. The common electrode voltage VCOM may be inputted from the PMIC 150.

Figure 6:
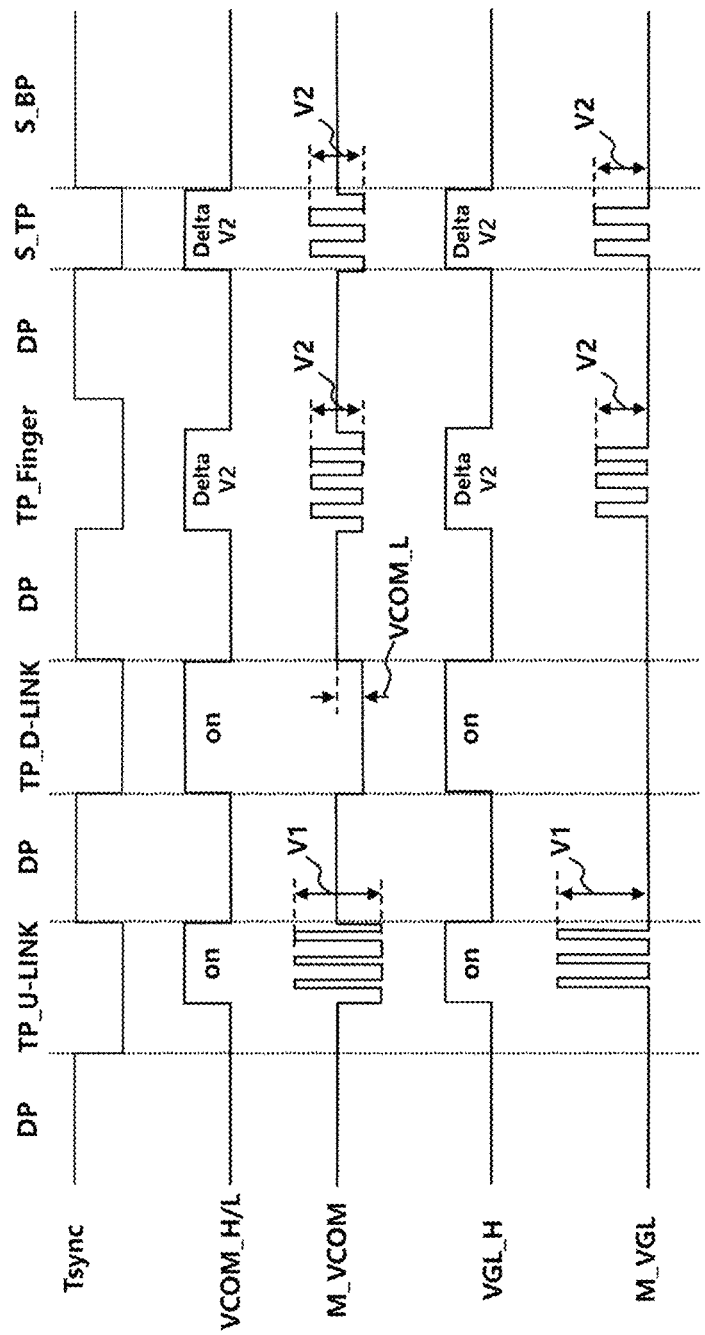

A general TMIC (not illustrated) receives a PWM that is continued at a second level (for example, a low (L) level) during the downlink period TP_D-LINK as illustrated in FIG. 5. Thus, a general driving signal generation circuit (not illustrated) outputs a low voltage (VCOM_L in FIG. 6) of a finger touch driving signal during the downlink period TP_D-LINK as illustrated in FIG. 6.

The low voltage of the finger touch driving signal outputted by the general driving signal generation circuit (not illustrated) during the downlink period TP_D-LINK may be a voltage unnecessary for pen touch driving.

In an embodiment, during the downlink period TP_D-LINK, the control circuit 330 of the TMIC 180 may not receive the PWM as illustrated in FIG. 7. Thus, the driving signal generation circuit 310 may prevent unnecessary power consumption by outputting the common electrode voltage VCOM to the first output terminal M_VCOM during the downlink period TP_D-LINK as illustrated in FIG. 9.

When the common electrode voltage VCOM is outputted to the first output terminal M_VCOM during the downlink period TP_D-LINK, the switch circuit connected to the output side of the first AMP 312 and the switch circuit connected to the output side of the second AMP 314 may be turned off. Furthermore, the switch circuit connected to the VCOM input line IL1 may be turned on.

Meanwhile, during the downlink period TP_D-LINK, the driving signal generation circuit 310 may turn on the first AMP 312 and the second AMP 314 as illustrated in FIG. 7, and output a reference voltage for touch pen sensing through a separate output terminal (not illustrated). Such a reference voltage may be supplied to the touch electrode TE.

In an embodiment, during a finger touch period for finger touch driving, the driving signal generation circuit 310 may turn on the first AMP 312 and the second AMP 314, and generate and output a finger touch driving signal. The signal intensity (V2 in FIG. 9) of the finger touch driving signal may be lower than that (V1 in FIG. 9) of the pen touch driving signal, and the switch circuit connected to the first AMP 312 and the switch circuit connected to the second AMP 314 may alternately repeat turn-on or turn-off. The switch circuit connected to the VCOM input line IL1 may maintain a turn-off state.

Meanwhile, when the touch check period S_TP is reached in the state in which the display device 100 has been switched to the sleep mode, the driving signal generation circuit 310 may turn on the first AMP 312 and the second AMP 314, generate a touch driving signal for the sleep mode, and output the generated touch driving signal to the first output terminal M_VCOM. The signal intensity (V3 in FIG. 9) of the touch driving signal for the sleep mode may be lower than that (V2 in FIG. 9) of the finger touch driving signal.

Since a general TMIC (not illustrated) may identify only the display driving period DP and the touch driving period TP through the touch synchronization signal Tsync and the PWM as illustrated in FIG. 5, a general driving signal generation circuit (not illustrated) outputs a touch driving signal for the sleep mode, which has the same signal intensity as that (V2 in FIG. 6) of the finger touch driving signal even during the touch check period S_TP of the sleep mode.

Since the touch driving signal for the sleep mode is a signal used when the MCU 160 determines the presence or absence of a finger touch in the sleep mode of the display device 100, the signal intensity of the touch driving signal for the sleep mode may be lower than that (V2 in FIG. 6 or FIG. 9) of the finger touch driving signal.

In an embodiment, the control circuit 330 of the TMIC 180 may receive the first identification signal TPEN and the second identification signal S3 and identify that the touch check period S_TP has reached. Thus, the driving signal generation circuit 310 may prevent unnecessary power consumption by outputting the touch driving signal for the sleep mode, which has a signal intensity (V3 in FIG. 9) lower than that (V2 in FIG. 9) of the finger touch driving signal, during the touch check period S_TP as illustrated in FIG. 9.

In other words, in an embodiment, the outputs of the first AMP 312 and the second AMP 314 of the driving signal generation circuit 310 may be adjusted under the control of the control circuit 330 that identifies that the touch check period S_TP has reached. Thus, the driving signal generation circuit 310 may output the touch driving signal for the sleep mode, which has a signal intensity lower than that of the finger touch driving signal. In such a case, the switch circuit connected to the first AMP 312 and the switch circuit connected to the second AMP 314 may alternately repeat turn-on or turn-off. The switch circuit connected to the VCOM input line IL1 may maintain a turn-off state.

The LFD signal generation circuit 320 may include a third amplifier (AMP) 322 for generating the first LFD signal corresponding to the pen touch driving signal or the second LFD signal corresponding to the finger touch driving signal, as illustrated in FIG. 4. Furthermore, the LFD signal generation circuit 320 may further include switch circuits connected to the third AMP 322 and a VGL input line IL2, respectively. An external compensation circuit RC3 may be connected in parallel to an output side of the third AMP 322.

During the uplink period TP_U-LINK, the LFD signal generation circuit 320 may turn on the third AMP 322, generate the first LFD signal, and output the generated first LFD signal to a second output terminal M_VGL. The switch circuit connected to the third AMP 322 and the switch circuit connected to the VGL input line IL2 may alternately repeat turn-on or turn-off.

During the downlink period TP_D-LINK, the LFD signal generation circuit 320 may turn off the third AMP 322 while outputting the gate low voltage VGL externally inputted. The gate low voltage VGL may be inputted from the PMIC 150 and the switch circuit connected to the third AMP 322 may be turned off.

During the downlink period TP_D-LINK, a general LFD signal generation circuit (not illustrated) outputs the gate low voltage VGL in the state in which the third AMP 322 is turned on as illustrated in FIG. 5 and FIG. 6.

In such a case, the third AMP 322 may be turned off during the downlink period TP_D-LINK. However, in a general TMIC (not illustrated), unnecessary power consumption occurs because the third AMP 322 is unnecessarily turned on during the downlink period TP_D-LINK.

Figure 8:
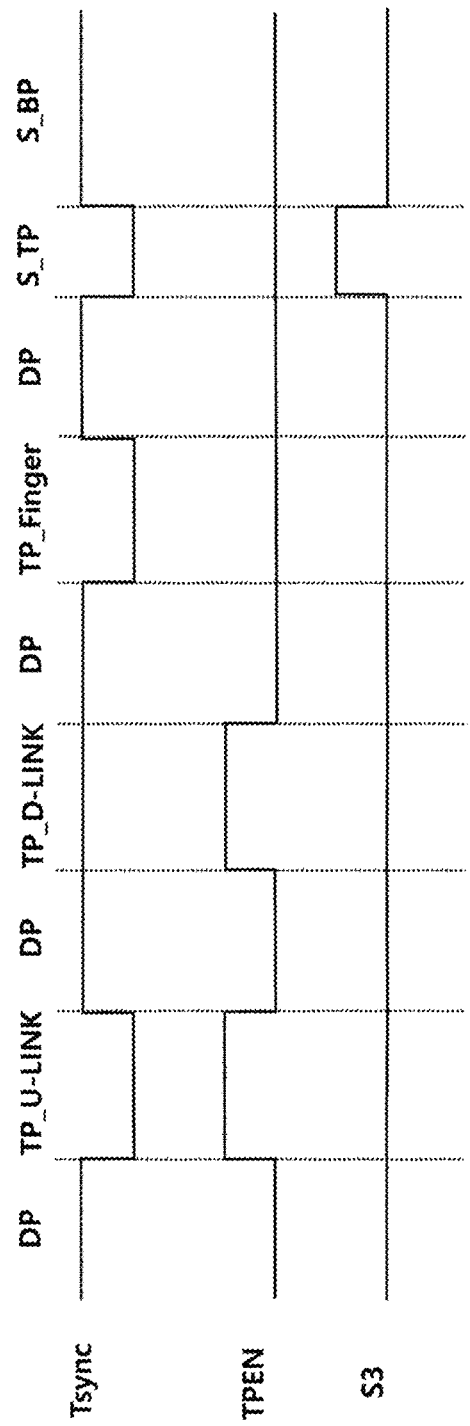

In an embodiment, during the downlink period TP_D-LINK, the control circuit 330 of the TMIC 180 may receive the first identification signal TPEN and identify the uplink period TP_U-LINK and the downlink period TP_D-LINK as illustrated in FIG. 8. Thus, the LFD signal generation circuit 320 may prevent unnecessary power consumption by turning off the third AMP 322 during the downlink period TP_D-LINK as illustrated in FIG. 9.

In other words, in an embodiment, the third AMP 322 of the LFD signal generation circuit 320 may be turned off under the control of the control circuit 330 that identifies the downlink period TP_D-LINK.

In order to output the gate low voltage VGL to the second output terminal M_VGL during the downlink period TP_D-LINK, the switch circuit connected to the third AMP 322 may be turned off. The switch circuit connected to the VGL input line IL2 may be turned on.

In an embodiment, during the finger touch period for finger touch driving, the LFD signal generation circuit 320 may turn on the third AMP 322, generate the second LFD signal, and output the generated second LFD signal to the second output terminal M_VGL.

Meanwhile, when the touch check period S_TP is reached in the state in which the display device 100 has been switched to the sleep mode, the LFD signal generation circuit 320 may turn off the third AMP 322 while outputting the gate low voltage VGL.

A general TMIC (not illustrated) outputs the touch driving signal for the sleep mode, which has the same signal intensity as that (V2 in FIG. 6) of the finger touch driving signal even during the touch check period S_TP of the sleep mode. Accordingly, during the touch check period S_TP, a general LFD signal generation circuit (not illustrated) turns on the third AMP 322 and outputs the second LFD signal as illustrated in FIG. 6.

Meanwhile, in an embodiment, since the signal intensity (V3 in FIG. 9) of the touch driving signal for the sleep mode is lower than that (V2 in FIG. 9) of the finger touch driving signal, the LFD signal may be unnecessary.

Accordingly, the LFD signal generation circuit 320 may prevent unnecessary power consumption by outputting the gate low voltage VGL to the second output terminal M_VGL in the state in which the third AMP 322 is turned off during the touch check period S_TP as illustrated in FIG. 9.

In other words, in an embodiment, the third AMP 322 of the LFD signal generation circuit 320 may be turned off under the control of the control circuit 330 that identifies that the touch check period S_TP has reached. Furthermore, the switch circuit connected to the third AMP 322 may be turned off and the switch circuit connected to the VGL input line IL2 may be turned on.

The control circuit 330 may receive the touch synchronization signal Tsync, the PWM, and the first identification signal TPEN from the MCU 160.

The control circuit 330 may control the driving signal generation circuit 310 and the LFD signal generation circuit 320 by checking the signal levels of the touch synchronization signal Tsync and the first identification signal TPEN.

Specifically, the control circuit 330 may identify, as the uplink period TP_U-LINK, a case where the signal level of the first identification signal TPEN is a first level (for example, a high level) and the signal level of the touch synchronization signal Tsync is a second level (for example, a low level) as illustrated in FIG. 8.

The control circuit 330, which has identified the touch driving period as the uplink period TP_U-LINK for pen touch driving, may control the driving signal generation circuit 310 to output the touch driving signal. Furthermore, the control circuit 330 may control the LFD signal generation circuit 320 to output the first LFD signal.

In other words, as illustrated in FIG. 7 and FIG. 9, the control circuit 330 may turn on the first AMP 312, the second AMP 314, and the third AMP 322, control the driving signal generation circuit 310 to output the pen touch driving signal by using the PWM, and control the LFD signal generation circuit 320 to output the first LFD signal.

Meanwhile, the control circuit 330 may identify, as the downlink period TP_D-LINK, a case where the signal levels of the first identification signal TPEN and the touch synchronization signal Tsync both are first levels (for example, high levels) as illustrated in FIG. 8.

The control circuit 330, which has identified the touch driving period as the downlink period TP_D-LINK, may control the driving signal generation circuit 310 to output the common electrode voltage VCOM. Furthermore, the control circuit 330 may control the LFD signal generation circuit 320 to output the gate low voltage VGL. In such a case, as illustrated in FIG. 7 and FIG. 9, the control circuit 330 may turn on the first AMP 312 and the second AMP 314, and turn off the third AMP 322. During the downlink period TP_D-UNK, the control circuit 330 may not receive the PWM from the MCU 160.

In an embodiment, the control circuit 330 may further receive the second identification signal S3 from the MCU 160 and check the signal level of the second identification signal S3.

When the signal level of the second identification signal S3 is a first level (for example, a high level) as illustrated in FIG. 8, the control circuit 330 may identify that the touch check period S_TP has reached in the sleep mode of the display device 100.

During the touch check period S_TP, the control circuit 330 may control the driving signal generation circuit 310 to output the touch driving signal for the sleep mode as illustrated in FIG. 7 and FIG. 9. Furthermore, the control circuit 330 may control the LFD signal generation circuit 320 to output the gate low voltage VGL. In such a case, the control circuit 330 may turn on the first AMP 312 and the second AMP 314, and turn off the third AMP 322.

Then, the control circuit 330 may adjust the outputs of the first AMP 312 and the second AMP 314.

In other words, the control circuit 330 may adjust the outputs of the first AMP 312 and the second AMP 314 to be smaller than those during the finger touch period.

In an embodiment, the control circuit 330 may identify, as the finger touch period TP_Finger, a case where the signal levels of the touch synchronization signal Tsync, the first identification signal TPEN, and the second identification signal S3 are all second levels (for example, low levels) as illustrated in FIG. 7 and FIG. 8 and the PWM is received.

During the finger touch period TP_Finger, the control circuit 330 may control the driving signal generation circuit 310 to output the finger touch driving signal as illustrated in FIG. 7 and FIG. 9. Furthermore, the control circuit 330 may control the LFD signal generation circuit 320 to output the second LFD signal. In such a case, the control circuit 330 may turn on the first AMP 312, the second AMP 314, and the third AMP 322.

As described above, in accordance with the present embodiment, the TMIC 180 may additionally receive the first identification signal TPEN from the MCU 160, identify the downlink period for pen touch driving, and prevent unnecessary power consumption during the downlink period, so that the power consumption of the display device 100 can be reduced.

Furthermore, the TMIC 180 may additionally receive the second identification signal S3 from the MCU 160, identify the touch check period in the sleep mode, and prevent unnecessary power consumption during the touch check period, so that the power consumption of the display device 100 can be reduced.

What is claimed is:

1. A touch power management circuit comprising:
   a driving signal generation circuit configured to output a pen touch driving signal to a touch electrode during an uplink period for pen touch driving and to output a direct current (DC) voltage to the touch electrode during a downlink period for pen touch driving; and
   a load free driving (LFD) signal generation circuit including one amplifier for generating a first load free driving signal corresponding to the pen touch driving signal and configured to turn on the one amplifier to generate the first load free driving signal during the uplink period and to turn off the one amplifier during the downlink period.

2. The touch power management circuit according to claim 1, wherein the driving signal generation circuit includes another amplifier for generating a finger touch driving signal having a lower signal intensity than that of the pen touch driving signal,
   turns on the other amplifier and generates the finger touch driving signal during a finger touch period for finger touch driving, and
   turns on the other amplifier and generates a touch driving signal for a sleep mode, which has a lower signal intensity than that of the finger touch driving signal, when a touch check period comes in a sleep mode of a display device.

3. The touch power management circuit according to claim 2, wherein, during the finger touch period, the LFD signal generation circuit turns on the one amplifier and generates a second load free driving signal corresponding to the finger touch driving signal.

4. The touch power management circuit according to claim 2, wherein, when the touch check period comes in the sleep mode, the LFD signal generation circuit turns off the one amplifier while outputting a gate low voltage.

5. The touch power management circuit according to claim 1, wherein the driving signal generation circuit includes another amplifier,
   turns on the other amplifier and generates the pen touch driving signal during the uplink period, and
   turns on the other amplifier and outputs a reference voltage for touch pen sensing during the downlink period.

6. The touch power management circuit according to claim 1, further comprising:
   a control circuit configured to receive a touch synchronization signal, a pulse width modulation (PWM) signal, and a first identification signal from a touch controller, to check levels of the touch synchronization signal and the first identification signal, and to control the driving signal generation circuit and the LFD signal generation circuit.

7. The touch power management circuit according to claim 6, wherein the control circuit identifies, as the uplink period, a case where the level of the first identification signal is a first level and the level of the touch synchronization signal is a second level.

8. The touch power management circuit according to claim 7, wherein the control circuit turns on the one amplifier, controls the driving signal generation circuit to output the pen touch driving signal by using the pulse width modulation signal, and controls the LFD signal generation circuit to output the first load free driving signal.

9. The touch power management circuit according to claim 6, wherein the control circuit identifies, as the downlink period, a case where the levels of the first identification signal and the touch synchronization signal are both first levels.

10. The touch power management circuit according to claim 9, wherein the control circuit turns off the one amplifier, controls the driving signal generation circuit to output a common electrode voltage, and controls the LFD signal generation circuit to output a gate low voltage.

11. The touch power management circuit according to claim 6, wherein the control circuit further receives a second identification signal from the touch controller, checks a level of the second identification signal, and identifies that a touch check period has come in a sleep mode of a display device when the levels of the touch driving signal and the first identification signal are both second levels and the level of the second identification signal is a first level.

12. The touch power management circuit according to claim 11, wherein the control circuit turns off the one amplifier, controls the driving signal generation circuit to output a touch driving signal for a sleep mode, which has a lower signal intensity than that of the finger touch driving signal, and controls the LFD signal generation circuit to output a gate low voltage.

13. A touch driving system comprising:
a touch driving device configured to drive a plurality of touch electrodes disposed in a panel of a display device; and
a touch power management circuit configured to receive a common electrode voltage and a gate low voltage from a power management circuit, to generate a pen touch driving signal and a load free driving (LFD) signal corresponding to the pen touch driving signal and output the generated pen touch driving signal and load free driving signal to the touch driving device during an uplink period for pen touch driving, and to turn off an amplifier for generating the load free driving signal while outputting the common electrode voltage and the gate low voltage to the touch driving device during a downlink period for pen touch driving.

14. The touch driving system according to claim 13, wherein the touch power management circuit receives a touch synchronization signal and a first identification signal from a touch controller and identifies the uplink period and the downlink period by checking levels of the touch synchronization signal and the first identification signal.

15. The touch driving system according to claim 14, wherein the touch power management circuit identifies, as the uplink period, a case where the levels of the touch synchronization signal and the first identification signal are different from each other, and identifies, as the downlink period, a case where the levels of the touch synchronization signal and the first identification signal are equal to each other.

16. The touch driving system according to claim 14, wherein the touch power management circuit further receives a second identification signal from the touch controller, checks a level of the second identification signal, and identifies that a touch check period has come in a sleep mode of the display device when the levels of the touch driving signal and the first identification signal are both second levels and the level of the second identification signal is a first level.

17. The touch driving system according to claim 13, wherein the touch power management circuit generates a finger touch driving signal and outputs the generated finger touch driving signal to the touch driving device during a finger touch period for finger touch driving, and
generates a touch driving signal for a sleep mode, which has a lower signal intensity than that of the finger touch driving signal and outputs the generated touch driving signal for the sleep mode to the touch driving device when a touch check period comes in the sleep mode of the display device.

18. The touch driving system according to claim 17, wherein, during the touch check period, the touch power management circuit outputs the gate low voltage to the touch driving device while outputting the touch driving signal for the sleep mode to the touch driving device.

\* \* \* \* \*